United States Patent [19]

Leininger

[11] Patent Number: 4,965,301
[45] Date of Patent: Oct. 23, 1990

[54] STABILIZATION OF POLYOLEFINS

[75] Inventor: James C. Leininger, Mauldin, S.C.

[73] Assignee: Phillips Petroleum Company, Bartlesville, Okla.

[21] Appl. No.: 186,264

[22] Filed: Mar. 7, 1988

Related U.S. Application Data

[62] Division of Ser. No. 677,421, Dec. 3, 1984, abandoned.

[51] Int. Cl.$^5$ .................. C08K 5/3492; C08K 3/32
[52] U.S. Cl. .................. 524/101; 524/120; 524/399; 524/417; 264/211; 8/490
[58] Field of Search .................. 8/490; 264/211; 524/101, 120, 399, 417

[56] References Cited

U.S. PATENT DOCUMENTS

| | | | |
|---|---|---|---|
| 2,952,658 | 9/1960 | Pfeider et al. | 524/132 |
| 3,642,690 | 2/1972 | Mills | 524/100 |
| 3,948,850 | 4/1976 | Hudgin | 524/417 |
| 4,025,486 | 5/1977 | Gilles | 524/101 |
| 4,086,204 | 4/1978 | Cassandrini et al. | 524/100 |
| 4,108,829 | 8/1978 | Cassandrini et al. | 524/100 |
| 4,185,004 | 1/1980 | Mathis | 524/120 |
| 4,278,590 | 7/1981 | Dexter et al. | 524/99 |
| 4,291,093 | 9/1981 | Wishman et al. | 428/378 |
| 4,293,468 | 10/1981 | Rody | 524/102 |
| 4,377,651 | 3/1983 | Leininger | 524/101 |

FOREIGN PATENT DOCUMENTS

| | | |
|---|---|---|
| 1131004 | 6/1962 | Fed. Rep. of Germany. |
| 51145556 | 3/1969 | Japan. |
| 48-11820 | 4/1973 | Japan. |

OTHER PUBLICATIONS

Textile Research Journal, Aug. 1978, vol. 48, No. 8, pp. 433–436, "Recent Progress in the Stabilization of Polypropylene Fibers".
Encyclopedia of Polymer Science and Technology (1968, John Wiley) 394, 432.

*Primary Examiner*—Kriellion Morgan
*Attorney, Agent, or Firm*—Hal Brent Woodrow

[57] ABSTRACT

In thermal stabilization of poly($\alpha$-olefin) fibers, such as a melt spun polypropylene, in which the poly($\alpha$-olefin) contains a hindered phenol, an organic phosphite, a hindered amine, and a metal salt of a fatty acid, the further inclusion of an alkali metal phosphate, such as sodium phosphate, results in improved thermal stability of the finished fiber.

23 Claims, No Drawings

STABILIZATION OF POLYOLEFINS

FIELD OF THE INVENTION

This application is a divisional of application Ser. No. 677,421, filed Dec. 3, 1984, now abandoned.

The invention pertains to methods and compositions for stabilization of poly(α-olefin) fibers. In another aspect, the invention pertains to an improved stabilizer composition. In a further aspect, the invention pertains to increased thermal stability of polyolefin fibers with finishes. In a related aspect, the invention pertains to stabilization of poly(α-olefin)s prior to forming into fibers and coating with finishes. In another aspect, the invention pertains to a stabilizing system employed in poly(α-olefin)s which are to be drawn into fibers or yarns and overcoated with a finish composition.

BACKGROUND OF THE INVENTION

In formation of textile materials from melt spun poly(α-olefin)s, such as propylene polymers, application of a finishing composition to the filaments, yarns, or other textile embodiments thereof, is a standard practice. The use of various types of finishes makes the spun or drawn fibers more amenable to subsequent operations such as spinning, winding, weaving, knitting, and helps to improve the properties of the finished articles such as garments. The finishing compositions reduce friction between the yarn fibers themselves, and between the yarn and various pieces of equipment with which the fiber comes into contact, such as guides and rollers. Finishes help prevent fiber yarn breakage, minimize excessive attraction or repulsion of the filaments caused by electrostatic charges, and so on. Finishing compositions generally contain a lubricant and an antistatic agent, and may include a variety of bactericides, corrosion inhibitors, and the like.

The poly(α-olefin)s are formulated with a variety of stabilizer compositions comprising small amounts of one or more ingredients or components intended to prevent undue degradation or deterioration from time, oxygen/ozone, elevated temperature, etc. Generally, for most purposes, the various stabilizer systems have been satisfactory.

However, for some reason, not yet determined, stabilizer compositions apparently satisfactory in the poly(α-olefin) lose effectiveness, particularly toward thermal degradation, when the resin is extruded or drawn into a fiber, and finished. Deterioration of thermal stability of the fiber is quite undesirable for many applications. Fabrics, garments, upholstery, and so on, intended for moderate usage frequently are exposed to quite high temperatures in closed automobiles, sun rooms, beach wear, and so on. To achieve customer satisfaction, long-term thermal stability is essential.

Overcoming shortcomings of stabilizer packages is important, but the answer must be available, economical, and readily employable. Preferably, it is an additive that can be included in a mixture of the stabilizers, and can be added to the poly(α-olefin) itself separately or as a part of the stabilizer package, thus avoiding adding an extra step in the finishing operation or fiber-forming operation.

BRIEF SUMMARY OF THE INVENTION

I have discovered that in poly(α-olefin)s employing a stabilizer package of effective amounts and relative proportions of (A) a hindered phenol, (B) an organic phosphite, (C) a hindered amine, and (D) a Group IA, IIA, or IIB soap of a long chain fatty acid, that the further inclusion of (E) of an effective amount and proportion of an alkali metal phosphate unexpectedly provides improved thermal stability in the finished poly(α-olefin) fiber.

It is an object of my invention to provide degradation resistance to poly(α-olefin)s. It is another object of my invention to provide an improved stabilizer system. In a particular aspect, it is an object of my invention to provide improved thermal stability to poly(α-olefin) fibers overcoated with a finishing composition.

Other objects, aspects, as well as the advantages of my invention become apparent to those skilled in the art from a reading of my specification and claims.

DETAILED DESCRIPTION OF THE INVENTION

Polyolefins

The poly(α-olefin)s include the normally solid homo-, co-, and terpolymers of aliphatic mono-1-olefins (α-olefins) as they are generally recognized in the art. Usually the monomers employed in making such poly(α-olefin)s contain 2 to 10 carbon atoms per molecule, though higher molecular weight monomers sometimes are used as comonomers. The invention is applicable also to blends of the polymers and copolymers prepared mechanically or in situ.

The monomers employed include ethylene, propylene, butene-1, pentene-1, 4-methyl-pentene-1, hexene-1, octene-1, decene-1, and the like, alone, or in admixture, or in sequential polymerization systems.

Exemplary polymers include polyethylene, the presently preferred polypropylene, propylene/ethylene copolymers in which propylene constitutes at least 80 mole percent of the copolymer, poly(1-butene), and various copolymers of ethylene/propylene, ethylene/1-hexene, etc., in which ethylene constitutes at least 80 mole percent of the copolymer. Processes for preparing various polymers are well known, including the use of various supported chromium catalysts, coordination catalysts, and the like, and my invention is not limited to a polymer made with a particular catalyst or process.

Stabilizer System

The stabilizer system I employ includes (A) at least one hindered phenol, (B) at least one organic phosphite, (C) at least one hindered amine, (D) at least one metal soap which is a Group IA, IIA, or IIB metal salt of a fatty acid of the approximate range of about $C_{10}$ to $C_{20}$ carbon atoms per molecule, and further in accordance with my invention (E) at least one alkali metal phosphate.

(A) Hindered Phenol

The (A) hindered phenol can be selected from among suitable and effective hindered phenols. Suitable isocyanurate compounds are disclosed in U.S. Pat. No. 4,025,486 at col. 3 lines 4 to 49, incorporated herein by reference. Among suitable hindered phenols are such as tetrakis[methylene(3,5-di-t-butyl-4-hydroxyhydrocinnamate)]methane; 1,3,5-trimethyl-2,4,6-tris(3,5-di-t-butyl-4-hydroxybenzyl)benzene; octadecyl [3-(3,5-di-t-butyl-4-hydroxyphenyl)]propionate; and preferably a symmetrical tris(3,5-di-t-alkyl-4-hydroxybenzyl)isocyanurate, particularly those which can be represented by the formula I:

hindered amines (sterically hindered amines) known in the art for polymer stabilization purposes when employed in an effective amount.

Among the suitable polytriazines are those disclosed in U.S. Pat. No. 4,086,204 col. 1 line 30 to col. 2 line 44, incorporated herein by reference, presently preferably, a polytriazine compound is one which can be represented by the formula III:

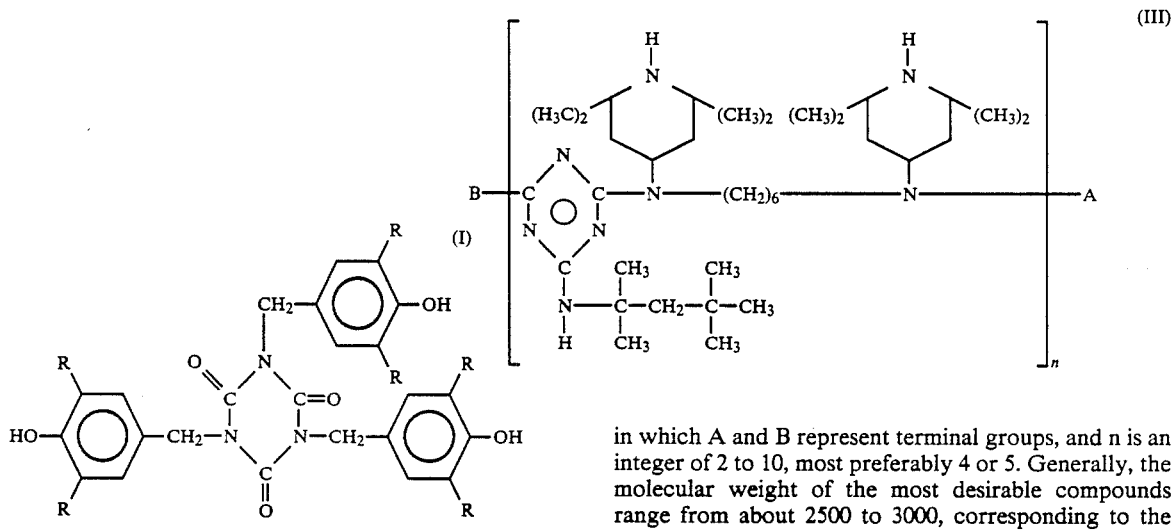

in which A and B represent terminal groups, and n is an integer of 2 to 10, most preferably 4 or 5. Generally, the molecular weight of the most desirable compounds range from about 2500 to 3000, corresponding to the above structure in which n is 4 or 5.

Other useful sterically hindered amines are those disclosed in U.S. Pat. Nos. 4,278,590, 4,377,651, and 4,293,468, such as:
bis-(2,2,6,6-tetramethylpiperidyl)sebacate,
bis-(1,2,2,6,6-pentamethylpiperidyl)sebacate,
bis-(1,2,2,6,6-pentamethyl-4-piperidyl)-2-n-butyl-2-(4-hydroxy-3,5-di-t-butylbenzyl)malonate,
bis-(1,2,2,6,6-pentamethyl-4-piperidinyl)dibenzylmalonate, and
4-stearyloxy-2,2,6,6-tetramethylpiperidine.

(D) Metal Soap

Metal salts of long chain fatty acids are employed in the stabilizing system. The metals are selected from the metals of Groups IA, IIA, and IIB of the Periodic Table, and can be employed alone or in admixture. The long chain fatty acids employed are those normally considered to be in the "soap" range, generally about $C_{10}$ to $C_{20}$ fatty acids.

While any of the metal salts in these groups can be employed including lithium, sodium, potassium, rubidium, cesium, beryllium, magnesium, calcium, strontium, barium, zinc, cadmium, and mercury, presently preferred for availability, economy, and low toxicity are those of sodium, potassium, and zinc. Typical metal salts of fatty acids are those of decanoic, dodecanoic, hexadecanoic, octadecanoic, and eicosanoic acids, and the like, including mixtures. Most commercial products are mixtures of various of these acids, though some are relatively pure and can be so employed. Presently most preferred is zinc stearate because of efficacy and low discoloration propensities in the various compositions employed.

(E) Alkali Metal Phosphate

Any of the alkali metal phosphates, those of lithium, sodium, potassium, rubidium, or cesium, can be employed, alone or in admixture. The term "phosphate" is intended to be a generic term including both the orthophosphates as well as those conventionally termed (I)

[Structure showing hindered phenol compound with formula containing CH2-N, C=O groups, and phenol rings with R substituents and OH groups]

in which each R group is a t-alkyl groups containing 4 to 8 carbon atoms, preferably t-butyl. A presently preferred compound is tris(3,5-di-t-butyl-4-hydroxybenzyl)isocyanurate.

Any of the above described hindered phenols, as well as others effective for the purpose, can be used, alone or in combination.

(B) Organic Phosphite

The (B) organic phosphite can be selected from among suitable and effective organic phosphites. Suitable organic phosphite compounds are disclosed in U.S. Pat. No. 4,025,486, col. 3 line 64 through col. 4 line 56, incorporated herein by reference. Among those particularly suitable are the organic phosphites which can be represented by the formula II:

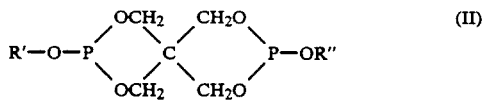

in which R' and R" are the same or different, and are selected from among alkyl, cycloalkyl, aryl, alkoxyalkyl, and the halo-substituted derivatives thereof, and combinations such as alkaryl, containing 1 to 20 carbon atoms per molecule. Preferably, R' and R" are the same and are alkaryl, most preferably alkylphenyl.

Specific examples include distearyl pentaerythritol diphosphite, diphenyl pentaerythritol diphosphite, dibenzyl pentaerythritol diphosphite, bis(2,4-di-t-butylphenyl)pentaerythritol diphosphite (preferred), and di-p-chlorophenyl pentaerythritol diphosphite.

Any of the above described organic phosphites, as well as others effective for the purpose, can be used alone or in admixture.

(C) Hindered Amine

The (C) hindered amine stabilizer component of the stabilizing system of my invention can be any of the "poly" phosphates, including metaphosphates, pyrophosphates, and the like. It is not intended to include an organophosphate.

Presently preferred is trisodium phosphate for economy, availability, and effectiveness. Other exemplary species include such as monosodium dihydrogen phosphate, dipotassium hydrogen phosphate, sodium metaphosphate, dipotassium pyrophosphate, and sodium tripolyphosphate, and the corresponding salts of the other alkali metals, alone or in admixture.

It is preferred to use anhydrous phosphates. However, hydrated salts can be employed if provision is made to remove the moisture, e.g. employing a devolatilizing extruder in the compounding and/or pelletizing operation.

Relative Amounts of Stabilizing Components

The relative amounts of each of the above stabilizing components should be that amount found effective in the stabilizer system employed, and each component should be employed in an amount relative to the other components to provide the desired benefit, such that an effective amount of each component is employed to provide the ultimate thermal and other benefits in the polymer and in end-use, particularly in finished fibers.

Presently suggested amounts of each component in parts by weight per 100 parts by weight polymer (php) are shown below in a generally broad range, as well as a presently preferred range:

TABLE I

| Component | Broad Range | Preferred Range |
|---|---|---|
| A Hindered phenol | about 0.05-1 | about 0.05-0.5 |
| B Organic phosphite | about 0.05-1 | about 0.05-0.2 |
| C Hindered amine | about 0.025-1 | about 0.025-0.5 |
| D Metal soap | about 0.025-1 | about 0.05-0.5 |
| E Alkali metal phosphate | about 0.005-0.25 | about 0.025-0.225 |

Amounts of Stabilizer System

The amount of stabilizer "package" as described should be that amount effective to provide the desired degree protection in the selected end-use. Presently suggested is an amount within the range of about 0.1 to 1 php, preferably about 0.2 to 0.5 php.

The stabilizer components as a stabilizer package can be used in the above relative weight proportions.

The stabilizer package components can be incorporated into the α-olefin polymer in any conventional manner, such as by dry blending the additive system directly with polymer pellets or fluff, by means of tumble mixers, Henschel blenders, and the like, as is known in the art. Solutions or slurries of the stabilizer ingredients can be sprayed onto or admixed with granular polymer. The stabilizer components can also be blended with molten polymer by means of a Banbury mixer, Brabender mixer, roll mill, screw extruder, and the like.

A convenient method is to add the components in a dry form to a granulated poly(α-olefin), followed by extruding to provide a pelletized product which then can be subsequently employed in fiber forming or other operations.

Other Ingredients

Other additives such as fillers, extenders, plasticizers, coloring agents, other polymeric materials, etc. can be added to the α-olefin polymer compositions being stabilized. These are usually most conveniently added to the polymer after the polymerization.

Uses

The improved stabilizer package in accordance with my invention can be employed in a variety of polyolefins for a variety of end-uses, including molded articles and the like, though presently it is most applicable to fiber-intended poly(α-olefin)s.

Fiber-Forming

In accordance with one particular mode for carrying out the present invention, a poly(α-olefin) melt, e.g. polypropylene, including minor amounts of a stabilizing system is melt spun into fibers and the finish composition comprising a synthetic lubricant and antistatic agent is applied thereto and the resulting filamentary materials are plied together, drawn about 5× at about 135° C. to form a yarn and the yarn is then wound up to form a package. While the finish compositions can be applied to the textile materials at any time during the processing thereof, it is preferably applied to the filaments as soon as they have set (solidified following extrusion).

Finishes

Any of the finishing compositions employed for poly(α-olefin) fibers can be employed. Preferred are finishes which comprise an ethoxylated lubricant and a phosphate ester.

The lubricants include any of the ethoxylated lubricants such as polyethylene glycols, mixed polyethylene-propylene glycols, monoalkyl esters of mixed polyethylene-polypropylene glycols, ethoxylated esters of fatty acids, rosin acids and tall oil acids, ethoxylated castor oils, ethoxylated hydrogenated castor oils, etc. The ethoxylated lubricants include ethoxylated aliphatic alcohols, ethoxylated alkylphenols, ethoxylated sorbitan (anhydrosorbitol) esters, ethoxylated sorbitol esters, ethoxylated glycerol esters, ethoxylated pentaerythritol esters, ethoxylated fatty acids, ethoxylated fatty acid amides, ethoxylated-propoxylated fatty acids, ethoxylated-propoxylated fatty acid esters, ethoxylated-propoxylated castor oils, ethoxylated-propoxylated hydrogenated castor oils, ethoxylated-propoxylated aliphatic alcohols, ethoxylated-propoxylated alkyl phenols, etc.

Presently preferred ethoxylated lubricants include random copolymers of the monobutyl ether of poly(oxyethyleneoxy-1,2-propylene) having viscosities in terms of Saybolt Universal Seconds (SUS) at 100° F. (38° C.) ranging from about 170 to 5100 and more preferably from about 250 to 3500, the methyl ether of poly(oxyethyleneoxy-1,2-propylene) laurate in which the number of moles of combined ethylene oxide is about 7 and the number of moles of combined propylene oxide is about 2, and the isododecyl ether/poly(oxyethylene) adduct in which the number of moles of combined ethylene oxide is about 6 per mole hydrophobe.

A description of the ethoxylated lubricants is given in Kirk-Othmer, *Encyclopedia of Chemical Technology*, 2nd Edition 19, 531-554 (1969). A description of the polyethylene glycols, etc. is given in volume 10, pages 654-659 of the reference encyclopedia.

The phosphate-type antistatic materials include hydrocarbyl phosphate esters, ethoxylated hydrocarbyl phosphate esters, partially hydrolyzed hydrocarbyl phosphate esters or their salts. By hydrocarbyl is meant a hydrocarbon radical selected from the alkyl, cycloalkyl, aryl, and combinations thereof such as alkylaryl, etc. containing 1 to 20 C atoms. Usually a mixture of di- and monoalkyl esters is utilized, but the composition is effective when completely esterified phosphoric acid compounds are employed. Preferably, the pH of the finish composition is maintained between about 3 and about 9 and preferably between about 4 and about 7. The preferred phosphate-type antistatic materials are the partially neutralized acid esters of phosphoric acid or the equivalent partially hydrolyzed triesters of phosphoric acid. The present order of neutralizing cations has been found to be ammonium, mono-, di-, and triethanolammonium, lithium, sodium, and potassium.

The finish composition also desirably contains a bactericide such as 6-acetoxy-2,4-dimethyl-m-dioxane (Givgard DXN ®, Givaudan Corp., Clifton, N.J.).

The relative amounts of the ingredients of the finish composition are not particularly critical. The ethoxylated lubricant should be used in amounts sufficient to lubricate the fibers, and the antistatic agent used in amounts sufficient to prevent undesirable electrostatic charges from building up. Generally, the ethoxylated lubricant is utilized in amounts between about 50 and 98, preferably between about 60 and 95, percent by weight of the composition. The antistatic agent is utilized in amounts between about 2 and 50, preferably between about 5 and 40, percent by weight of the finish composition. The bactericide may be present in amounts of up to about 1 percent by weight of the final composition, and like minor amounts of other suitable additives may be included, such as corrosion inhibitors.

The finish composition can be applied to the poly(α-olefin) fibers in any desired manner, using conventional finish applicators. The amount of finish composition applied to the poly(α-olefin) fibers is sufficient to impart desired properties to the fibers, e.g., about 0.2 to 2.5 weight percent (dry basis) with the filaments. The finish composition preferably is applied to the filaments as soon as they have set. Spun poly(α-olefin) yarns, e.g., polypropylene yarns, of improved thermal stability, thus produced, can be draw-twisted and again packaged.

EXAMPLES

Examples provided are intended to further illustrate the scope of my invention, without limiting the invention to specific species or amounts employed.

EXAMPLE I

A series of compositions was prepared by admixing a commercially available polypropylene fluff (nominal melt flow of 12 as determined by ASTM D 1238-65T, condition L, and a melting point of about 170° C.) containing about 0.05 parts by weight of 2,6-di-t-butyl-methylphenol as antioxidant with the indicated amounts of the specified alkali metal phosphate and the specified stabilizers. All additive levels are given in terms of parts by weight per 100 parts by weight polymer.

The following stabilizer system was employed:
(A) hindered phenol, 0.075 (Goodrite 3114), tris(3,5-di-t-butyl-4-hydroxybenzyl)isocyanurate;
(B) organic phosphite, 0.075 (Weston MDW626), bis(2,4-di-t-butylphenyl)pentaerythritol diphosphite;
(C) hindered amine, 0.0375 (Chimassorb 944) polytriazine compound of formula III having a molecular weight of about 2500 to 3000;
(D) metal soap, 0.07 zinc stearate.

Each blend was initially mixed together by combining the additives with the polymer fluff (powder). The resulting blend was extruded at about 245° C. into strands and chopped into pellets. The resulting pellets were then reextruded and repelletized as before to produce each final composition.

The pelleted compositions were melt spun at about 260° C. into an 8 strand-multifilament to which the finish containing an antistatic agent and ethoxylated lubricant was applied. The amount of finish was about 1 to 1.5 weight percent based on the weight of fiber. Four such multifilaments were plied together and drawn at 5× at about 135° C. to produce a yarn. The yarn was knitted to produce sleeves about 5 cm in diameter which were cut into convenient lengths for the testing procedures.

The test procedures were:
(1) Thermal stability—sleeves about 4 cm in length were suspended from clips and hung in an electrically heated, forced air oven maintained at 130° C. or 135° C. as specified. The specimens were examined periodically, generally every 24 hours. Time to failure was arbitrarily taken as the number of exposure hours required to weaken the fabric so that it was observed to flake when gently scratched with a finger nail or plastic needle.

(2) Gas fading—AATCC test method 23-1975.

(3) UV stability—The UV stability of the samples were determined in two test methods. In Method 1, a (GMC) twin-carbon arc weatherometer was employed at a black panel temperature averaging about 88° C. Periodic water spraying also occurs in this test. Each sample for Method 1 was mounted on a black-backed Atlas mounting fadeometer card, and was periodically examined for degradation, usually about every 20 hours. Degradation (time to failure) was arbitrarily taken as the number of exposure hours required to show flaking as described under thermal stability. In Method 2, a xenon arc weatherometer was employed at a black panel temperature of about 63° C. and no water spray. Samples for Method 2 were mounted on white cardboard and periodically checked as above to determine the number of exposure hours to failure. This test is also described under AATCC test method E-1971.

The alkali metal phosphates employed and the test results obtained are shown in Table I:

TABLE I

| | Effect Of Alkali Metal Phosphates In Polypropylene | | | | | | | |
|---|---|---|---|---|---|---|---|---|
| | Parts by Weight | | | Oven, 130° C. Hours to | % | Gas Fade[5] | Weatherometer Hours to Failure | |
| Run No.[1] | Na$_3$PO$_4$ | Li$_3$PO$_4$ | Finish | Failure | Improve. | 2 Cycle | GMC | Xenon |
| 1 (Control) | —[2] | — | A[3] | 1848 | — | 3–4 | 380 | 920 |
| 2 (Invention) | 0.05 | — | A | 2458 | 33 | 3–4 | 380 | 920 |
| 3 (Invention) | — | 0.05 | A | 2184 | 18 | 3 | 380 | 880 |
| 4 (Control) | — | — | B[4] | 1080 | — | 2–3 | 380 | 880 |
| 5 (Invention) | 0.05 | — | B | 2184 | 102 | 2–3 | 440 | 1020 |

TABLE I-continued

Effect Of Alkali Metal Phosphates In Polypropylene

| Run No.[1] | Parts by Weight | | | Oven, 130° C. Hours to Failure | % Improve. | Gas Fade[5] 2 Cycle | Weatherometer Hours to Failure | |
|---|---|---|---|---|---|---|---|---|
| | Na₃PO₄ | Li₃PO₄ | Finish | | | | GMC | Xenon |
| 6 (Invention) | — | 0.05 | B | 1248 | 16 | 2–3 | 380 | 820 |

[1]Each "Run" is an arithmetic average of three separate runs.
[2]A dash indicates no additive or no entry needed.
[3]Finish A - a predominantly ethoxylated fatty acid ester lubricant, and phosphate ester antistatic agent, as described in U.S. Pat. No. 4,291,093, Sept. 22, 1981, to Wishman et al.
[4]Finish B - a predominantly ethoxylated fatty acid ester lubricant, as described in U.S. Pat. No. 4,291,093, Sept. 22, 1981, to Wishman et al.
[5]Gas Fade: (5) (best) is no change in color; (1) (worst) is severe change or fading of color; other values inbetween.

The finish applied to the spun fibers can have some influence on the stability of the fiber as the data in Table I show. Generally, finishes are prodegradant to some extent. In comparing results, it is essential to do so in a given series wherein the same finish is applied.

The results shown in Table I demonstrate that substantial improvement in fiber thermal stability is obtained by including an alkali metal phosphate in the stabilizer system. A percentage improvement ranging from 18 to 16 percent is noted in invention Runs 3 and 6 by the inclusion of trilithium phosphate relative to the respective control Runs 1 and 4.

With trisodium phosphate, the percentage improvement ranges from 33 to 102 percent in invention Runs 2 and 5 as compared to the respective control Runs 1 and 4.

Both alkali metal phosphates are effective, but trisodium phosphate is the preferred species in view of the better results obtained by its use.

The effect of the alkali metal phosphates on UV stability is generally not as conclusive except for the unexpectedly higher values obtained in invention Run 5 using trisodium phosphate. In Run 5, a 16 percent increase in the number of exposure hours needed to reach failure was shown in both the GMC and xenon Weatherometers.

A slight decrease of 4 percent and 7 percent in xenon Weatherometer results was noted in invention Runs 3 and 6 using trilithium phosphate. However, the trilithium phosphate had no apparent effect on the GMC results as shown in invention Runs 3 and 6.

The effects of alkali metal phosphates are shown to be nil or nearly so on gas fading based on the results in Table I. However, the values of 2–3 obtained for the samples in Runs 4–6 indicate more color (darkening) than the 3–4 of Runs 1–3. The differences in color obtained show that the finish applied to the fiber can influence color. However, the addition of the alkali metal phosphate to the stabilizing system improves thermal stability with little or no effect on color development for a given series.

EXAMPLE II

A series of compositions was prepared from pellets of 12 melt flow polypropylene containing the stabilizer system described in Example I, but absent any alkali metal phosphate.

In this series, the stabilized polypropylene pellets were ground into fine particles. Each composition was admixed with the specified quantity of trisodium phosphate, extruded twice, spun into multifilaments to which 1.5 weight percent finish was applied, and converted into knitted sleeves, as described before. Sample sleeves of each composition were tested for thermal stability in air ovens maintained at 130° C. and 135° C., respectively. The quantity of trisodium phosphate added to the stabilizing system and the results obtained are set forth in Table II:

TABLE II

Effect Of Trisodium Phosphate concentration

| | | Thermal Stability | | | |
|---|---|---|---|---|---|
| | | 130° C. | | 135° C. | |
| Run No. | Na₃PO₄ Parts By Weight | Hours to Failure | % Improve. | Hours to Failure | % Improve. |
| 7 | 0 (control) | 1512 | — | 336 | — |
| 8 | 0.01 | 4536 | 200 | 552 | 64 |
| 9 | 0.03 | 4896 | 224 | 1248 | 271 |
| 10 | 0.05 | 5208 | 244 | 1680 | 400 |
| 11 | 0.08 | 5208 | 244 | 1680 | 400 |
| 12 | 0.10 | 5208 | 244 | 1680 | 400 |
| 13 | 0.20 | 5208 | 244 | 2352 | 600 |
| 14 | 0.30 | could not convert into filaments | | | |
| 15 | 0.50 | | | | |

The results in Table II demonstrate the effectiveness of trisodium phosphate on thermal stability within the range of about 0.01 to 0.2 parts per weight based on the composition. As the concentration of trisodium phosphate increases, the thermal stability of the fiber also increases. Concentrations of the salt in the range of about 0.3 or higher parts by weight may still help thermal stability if the particle size is small enough to pass through the screen pack and/or fiber breakage is no problem. However, presently, the upper limit appears to be about 0.2 parts by weight and preferably is in a concentration of about 0.05 parts by weight.

The data in Table II suggest that the thermal stability of polypropylene fibers is increased at temperatures ranging from above room temperature, e.g. 30° C., to perhaps about 150° C. by the inclusion of an alkali metal phosphate.

The disclosure, including data, has illustrated the value and effectiveness of my invention. The examples, the knowledge and background of the field of the invention and the general principles of chemistry and of other applicable sciences have formed the bases from which the broad descriptions of my invention including the ranges of conditions and the generic groups of operant components have been developed, and formed the bases for my claims here appended.

I claim:

1. A stabilizer, useful in spun poly(α-olefin) fibers, comprising effective weight ratios of (A) at least one hindered phenol, (B) at least one organic phosphite, (C) at least one hindered amine, (D) at least one metal soap, defined as a Group IA, IIA, or IIB metal salt of a long-chain fatty acid, and (E) trisodium phosphate and provided in a range of from about 0.005 to about 0.25 parts by weight per 100 parts by weight polymer.

2. The stabilizer of claim 1 wherein said (A) hindered phenol is selected from the group consisting of: tetrakis[methylene(3,5-di-t-butyl-4-hydroxyhydrocinnamate)]methane; 1,3,5-trimethyl-2,4,6-tris(3,5-di-t-butyl-4-hydroxybenzyl)benzene; octadecyl [3-(3,5-di-t-butyl-4-hydroxyphenyl)]propionate; and a symmetrical tris(3,5-di-t-alkyl-4-hydroxybenzyl)isocyanurate.

3. The stabilizer of claim 1 wherein said (B) organic phosphite is selected from phosphites represented by:

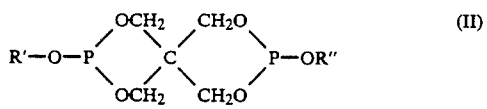

(II)

wherein R' and R" are each selected from the group consisting of alkyl, cycloalkyl, aryl, alkoxyaryl combination radicals, and halo-substituted derivatives thereof, containing 1 to 20 carbon atoms.

4. The stabilizer of claim 1 wherein said (B) organic phosphite is selected from the group consisting of distearyl pentaerythritol diphosphite, diphenyl pentaerythritol diphosphite, dibenzyl pentaerythritol diphosphite, bis(2,4-di-t-butylphenyl)pentaerythritol diphosphite (preferred), and di-p-chlorophenyl pentaerythritol diphosphite.

5. The stabilizer of claim 1 wherein said (C) hindered amine is selected from the group consisting of polytriazines, bis-(2,2,6,6-tetramethylpiperidyl)sebacate, bis-(1,2,2,6,6-pentamethylpiperidyl)sebacate, bis-(1,2,2,6,6-pentamethyl-4-piperidyl)-2-n-butyl-2-(4-hydroxy-3,5-di-t-butylbenzyl)malonate, bis-(1,2,2,6,6-pentamethyl-4-piperidinyl)dibenzylmalonate, and 4-stearyloxy-2,2,6,6-tetramethylpiperidine.

6. The stabilizer of claim 4 wherein said (C) hindered amine is a polytriazine.

7. The stabilizer of claim 6 wherein said (D) metal soap is zinc soap.

8. The stabilizer of claim 7 wherein said metal soap is the zinc salt of decanoic, dodecanoic, hexadecanoic, octadecanoic, and eicosanoic acids.

9. The stabilizer of claim 1 employing a relative weight ratio of about:
(A) 0.05 to 1,
(B) 0.05 to 1,
(C) 0.025 to 1,
(D) 0.025 to 1, and
(E) 0.005 to 0.25.

10. The stabilizer of claim 1 employing a relative weight ratio of about:
(A) 0.05 to 0.5,
(B) 0.05 to 0.2,
(C) 0.025 to 0.5,
(D) 0.05 to 0.5, and
(E) 0.025 to 0.225.

11. Poly(α-olefin) fibers containing an effective amount of the stabilizer of claim 1.

12. The poly(α-olefin) fibers containing about 0.1 to 1 php of the stabilizer of claim 9.

13. The poly(α-olefin) fibers of claim 12 containing about 0.2 to 0.5 php of said stabilizer.

14. The poly(α-olefin) fibers of claim 13 wherein said fiber is made from an α-olefin selected from α-olefins of 2 to 10 carbon atoms per molecule.

15. The poly(α-olefin) fibers of claim 14 wherein said poly(α-olefin) is a polypropylene.

16. The stabilized polypropylene fibers of claim 13 employing:
(A) tris(3,5-di-t-butyl-4-hydroxybenzyl)isocyanurate,
(B) bis(2,4-di-t-butylphenyl)pentaerythritol diphosphite,
(C) polytriazine of molecular weight about 2500 to 3000,
(D) zinc stearate, and
(E) trisodium phosphate.

17. Finish-coated stabilized poly(α-olefin) fibers of claim 11.

18. Finish-coated stabilized fibers of claim 13.

19. Finish-coated stabilized fibers of claim 16.

20. The finish-coated fibers of claim 17 wherein said α-olefins of 2 to 10 carbon atoms per molecule.

21. The finish-coated fibers of claim 20 wherein said poly(α-olefin) is a polypropylene.

22. The finish-coated fibers of claim 21 wherein said finish comprises an ethoxylated lubricant and a phosphate ester antistatic material.

23. The finish-coated fiber of claim 22 containing as stabilizer in said polypropylene:
(A) tris(3,5-t-butyl-4-hydroxybenzyl)isocyanurate,
(B) bis(2,4-di-t-butylphenyl)pentaerythritol diphosphite,
(C) polytriazine of molecular weight about 2500 to 3000,
(D) zinc stearate, and
(E) trisodium phosphate.

* * * * *